(12) United States Patent
Tomiyama et al.

(10) Patent No.: US 8,151,471 B2
(45) Date of Patent: Apr. 10, 2012

(54) CONTROL HANDLE OF A BUSH CUTTER AND A BUSH CUTTER THEREWITH

(75) Inventors: Hideki Tomiyama, Tokyo (JP); Masanobu Yoshimura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/382,179

(22) Filed: Mar. 10, 2009

(65) Prior Publication Data

US 2009/0229131 A1 Sep. 17, 2009

(30) Foreign Application Priority Data

Mar. 17, 2008 (JP) ................................ 2008-067130

(51) Int. Cl.
*A01D 34/68* (2006.01)
(52) U.S. Cl. .................. 30/276; 200/43.17; 200/321
(58) Field of Classification Search .............. 30/210, 30/216, 276; 200/43.17, 293.1, 321, 332.2
See application file for complete search history.

(56) References Cited

U.S. PATENT DOCUMENTS

| 3,839,614 | A | * | 10/1974 | Saganowski et al. | 200/43.17 |
| 3,847,233 | A | * | 11/1974 | Glover et al. | 173/170 |
| 4,122,320 | A | * | 10/1978 | Edgell et al. | 200/43.17 |
| 4,847,451 | A | * | 7/1989 | Nagata | 200/1 V |
| 5,159,986 | A | * | 11/1992 | Hoser | 173/48 |
| 5,223,770 | A | * | 6/1993 | Schlessmann | 318/17 |
| 5,577,600 | A | * | 11/1996 | Schoene et al. | 200/43.17 |
| 5,638,945 | A | * | 6/1997 | Fukinuki et al. | 200/43.17 |
| 5,724,737 | A | * | 3/1998 | Stones | 30/228 |
| 6,218,633 | B1 | * | 4/2001 | Okumura et al. | 200/43.17 |
| 6,274,828 | B1 | * | 8/2001 | Chu | 200/43.17 |
| 6,469,269 | B1 | * | 10/2002 | Jong | 200/522 |
| 6,610,946 | B2 | * | 8/2003 | Covell et al. | 200/321 |
| 7,805,844 | B2 | * | 10/2010 | Yoshida | 30/276 |
| 2010/0313430 | A1 | * | 12/2010 | Yamaoka et al. | 30/276 |

FOREIGN PATENT DOCUMENTS

JP 2006-217843 8/2006

* cited by examiner

*Primary Examiner* — Hwei C Payer
(74) *Attorney, Agent, or Firm* — Smith, Gambrell & Russell, LLP

(57) ABSTRACT

A control handle included in a bush cutter is provided. A driving controller is switched on so that the cutting blade is driven in an adjusted speed mode at a rotation speed set by a speed adjuster. The control handle includes a high-speed mode controller configured to set the rotation speed of the cutting blade to a high rotation speed, and an interlock device provided between the driving controller and the high-speed mode controller and configured to interlock the driving controller and the high-speed mode controller when the high-speed mode controller is switched on so as to move the driving controller concurrently with the high-speed mode controller. When the high-speed mode controller is switched on, the driving controller is concurrently switched on by the interlock device so that the cutting blade is driven in a high-speed mode.

18 Claims, 6 Drawing Sheets

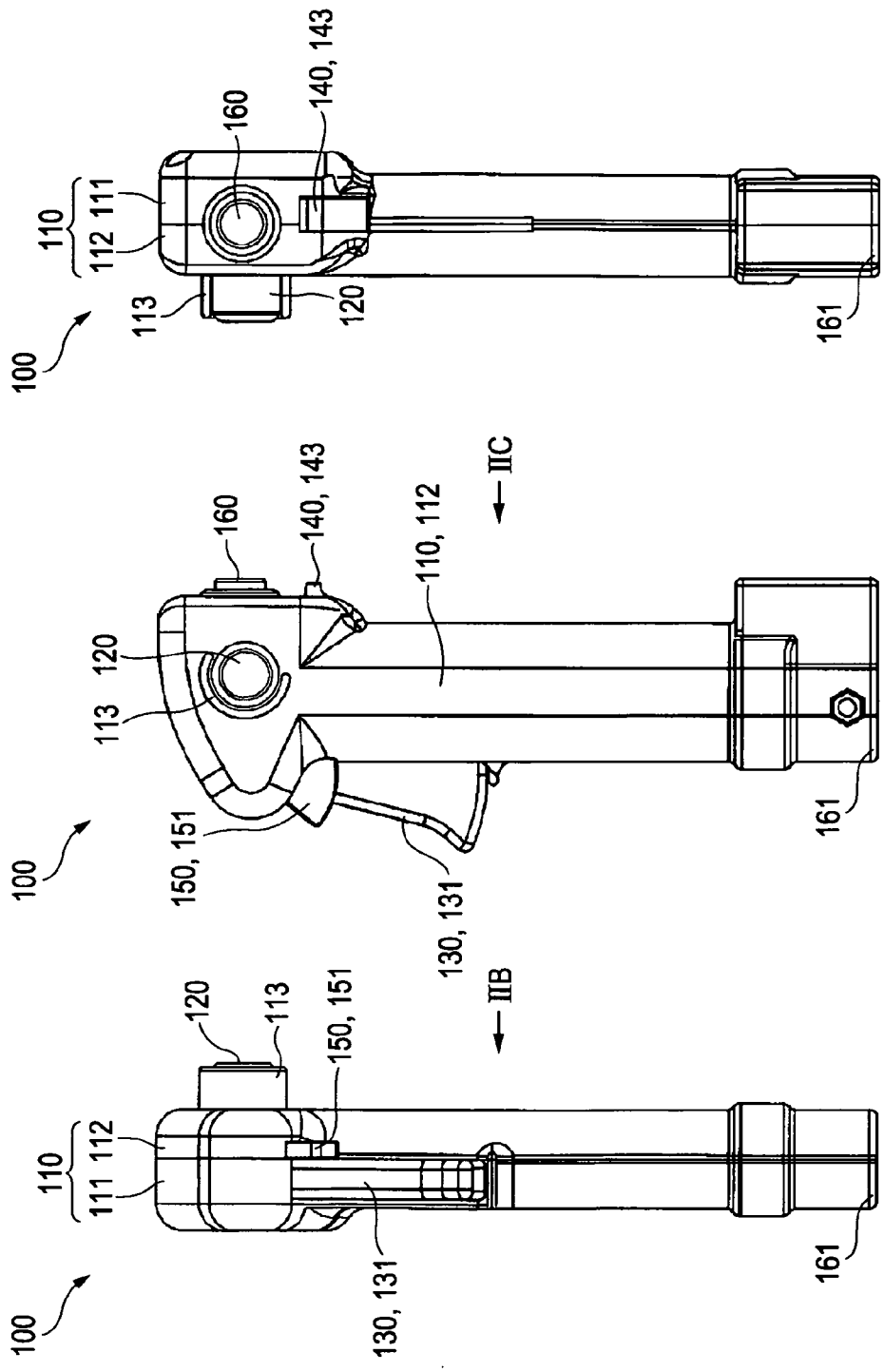

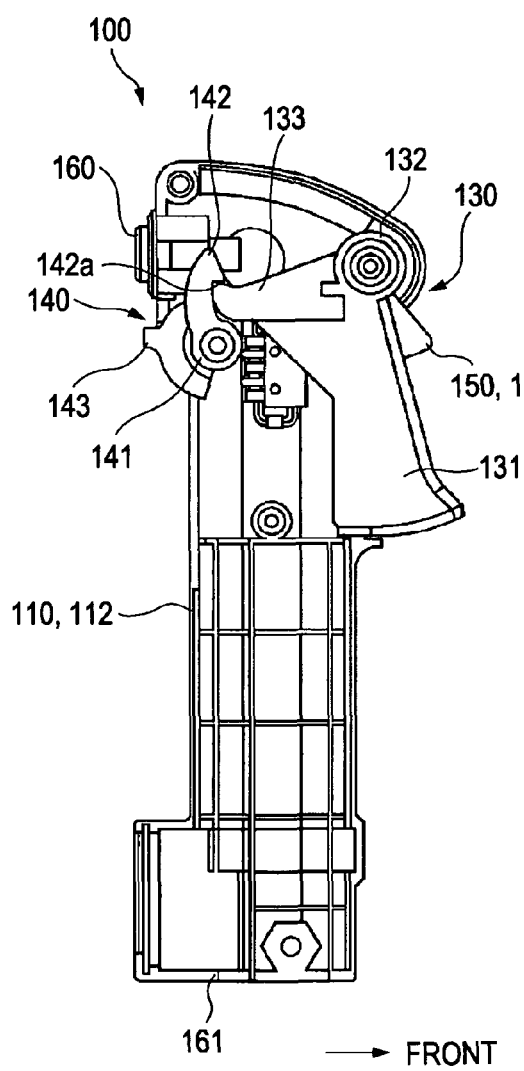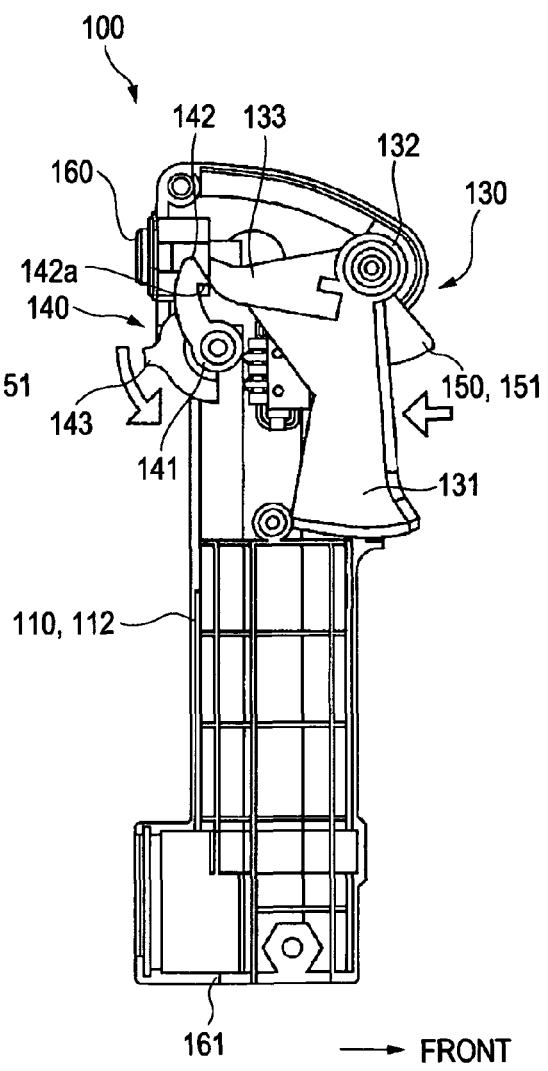

CONTROL HANDLE OF A BUSH CUTTER AND A BUSH CUTTER THEREWITH

CROSS REFERENCES TO RELATED APPLICATIONS

The disclosure of Japanese Patent Application No. 2008-067130 filed on Mar. 17, 2008 including the specification, drawings and abstract is incorporated herein by reference in its entirety.

BACKGROUND OF THE INVENTION

The present invention relates to control handles of bush cutters used for cutting, for example, vegetation, and to bush cutters. In particular, the present invention relates to an improvement in the operability of a control handle and a bush cutter when a cutting blade is to be rotated at high speed.

DESCRIPTION OF THE RELATED ART

A bush cutter is a device used for cutting grass, shrubs, and other similar kinds of vegetation. Generally, a bush cutter has a rotary cutting blade and a power unit for driving the cutting blade, which are respectively disposed at opposite ends of a control arm containing a power transmission shaft. The operator can use the bush cutter by operating an operable portion provided on a handle that is fixed to the middle of the control arm. Bush cutters of the related art generally use an internal combustion engine used as a power unit, but electrical bush cutters that use a secondary battery, such as a lithium-ion battery, and an electric motor are becoming widely used in recent years.

Generally, in an electrical bush cutter, the cutting blade can be rotated by operating an on/off lever (power switch), and the rotation speed of the cutting blade is set by using a speed-adjustment operable portion, such as a speed adjustment knob, so that the cutting blade is made to rotate at a desired rotation speed. For a higher level of safety, the on/off lever is provided with a safety device that prohibits the cutting blade from rotating unless a predetermined operation is performed.

As another related art, a bush cutter equipped with a high-speed rotation switch for maintaining the rotation speed of a motor in a high rotation range in addition to an on/off lever is also known. With such a bush cutter, the operator can operate the high-speed rotation switch while simultaneously operating the on/off lever so that the motor can be rotated at high speed when a temporary high output is necessary. See Japanese Unexamined Patent Application Publication No. 2006-217843 for an example.

However, in the related art described above, even when the operator desires to start the bush cutter directly from a shut-down state to a high-speed mode, a total of three manual operations are necessary, namely, releasing the safety device, operating the on/off lever, and operating the high-speed rotation switch, thus making the entire operation troublesome.

SUMMARY OF THE INVENTION

Accordingly, it is an object of the present invention to provide a bush-cutter control handle and a bush cutter that allow for an improvement in the operability thereof when a cutting blade is to be rotated at high speed.

In order to achieve the aforementioned object, the present invention provides the following solutions.

A first aspect of the present invention provides a control handle included in a bush cutter that cuts an object to be cut by driving a rotary cutting blade. In the control handle, a driving controller that is capable of setting the cutting blade to rotate is switched on so that the cutting blade is driven in an adjusted speed mode at a rotation speed set by a speed adjuster. The control handle includes a high-speed mode controller configured to set the rotation speed of the cutting blade to a high rotation speed, and an interlock device provided between the driving controller and the high-speed mode controller and configured to interlock the driving controller and the high-speed mode controller when the high-speed mode controller is switched on so as to move the driving controller concurrently with the high-speed mode controller. When the high-speed mode controller is switched on, the driving controller is concurrently switched on by the interlock device so that the cutting blade is driven in a high-speed mode.

In the first aspect of the present invention, the driving controller and the high-speed mode controller are provided in a rotatable manner about a predetermined axis and are formed to have a lever-like shape that can be switched on manually by the operator. However, the present invention is not limited to this configuration. The driving controller and the high-speed mode controller can alternatively be, for example, push button switches or other types of switches.

Although the high-speed mode controller can generally cause the power unit to be driven at a maximum permissible rotation speed, the present invention is not limited to this configuration. For example, the rotation speed in the high-speed mode can be of any rotation speed so long as it is higher than that in the normal adjustable speed mode.

In the first aspect of the present invention, the control handle can further include a lock device and an operable portion for unlocking the lock device. Specifically, the lock device is configured to lock the driving controller and the high-speed mode controller to positions for stopping the cutting blade from rotating, and the operable portion is configured to unlock the lock device so as to set both the driving controller and the high-speed mode controller in an operable state.

In the first aspect of the present invention, the interlock device can include an engagement member that brings the high-speed mode controller and the driving controller into engagement with each other when the high-speed mode controller is switched on, and the lock device can include a lock member that engages with the driving controller.

A second aspect of the present invention provides a brush cutter that includes a cutting blade, a power unit that rotationally drives the cutting blade, a control arm whose one end has the cutting blade attached thereto, and the control handle according to the first aspect. Specifically, the control handle is fixed to the control arm and used for controlling the power unit.

The present invention can provide the following advantages.

1. With the interlock device provided for interlocking the driving controller and the high-speed mode controller when the high-speed mode controller is switched on so as to move the driving controller concurrently with the high-speed mode controller, the bush cutter can be driven in a high-speed mode, if desired by the operator, by simply operating the high-speed mode controller. This operation differs from the operation performed for the normal adjustable speed mode only in that the high-speed mode controller is selectively operated in place of the driving controller. Therefore, the operator can intuitively select between the adjustable speed mode and the high-speed mode, thereby improving the operability.

2. With the lock device provided for locking the driving controller and the high-speed mode controller to their respective positions for stopping the operation of the bush cutter as well as the operable portion provided for unlocking the lock device to set both the driving controller and the high-speed mode controller in an operable state, the operator only needs to perform two manual operations to start the high-speed mode, which include unlocking the lock device by using the operable portion and then operating the high-speed mode controller. Since this operation differs from the operation performed for the normal adjustable speed mode only in that the high-speed mode controller is selectively operated in place of the driving controller, the operator can intuitively select between the adjustable speed mode and the high-speed mode, thereby further improving the operability.

3. With the engagement member provided for interlocking the driving controller and the high-speed mode controller when the high-speed mode controller is switched on so as to move the driving controller concurrently with the high-speed mode controller as well as the lock member provided in the lock device for engaging with the driving controller so as to lock the driving controller, the high-speed mode controller can also be locked indirectly via the driving controller and the interlock device when the lock device locks the driving controller. Accordingly, the lock device can have a simplified configuration, and the present invention can be applied to an already available control handle by a slight change in design.

BRIEF DESCRIPTION OF THE DRAWINGS

FIGS. 2A, 2B, and 2C respectively show three faces of a control handle of the bush cutter shown in FIG. 1;

FIGS. 3A and 3B are right side views showing a state where a right half portion is removed from the control handle shown in FIGS. 2A to 2C, and respectively show a locked state and an unlocked state;

DESCRIPTION OF THE PREFERRED EMBODIMENTS

The present invention provides a bush-cutter control handle that allows for an improvement in operability when a cutting blade is to be rotated at high speed and to provide a bush cutter equipped with such a control handle. In order to achieve this, the bush-cutter control handle and the bush cutter are provided with an engagement portion, which comes into engagement with a throttle lever when a high-speed lever is switched on so as to move the throttle lever concurrently with the high-speed lever, and a lock device that locks the throttle lever.

A bush-cutter control handle and a bush cutter according to an embodiment of the present invention will be described below.

Figure 1:
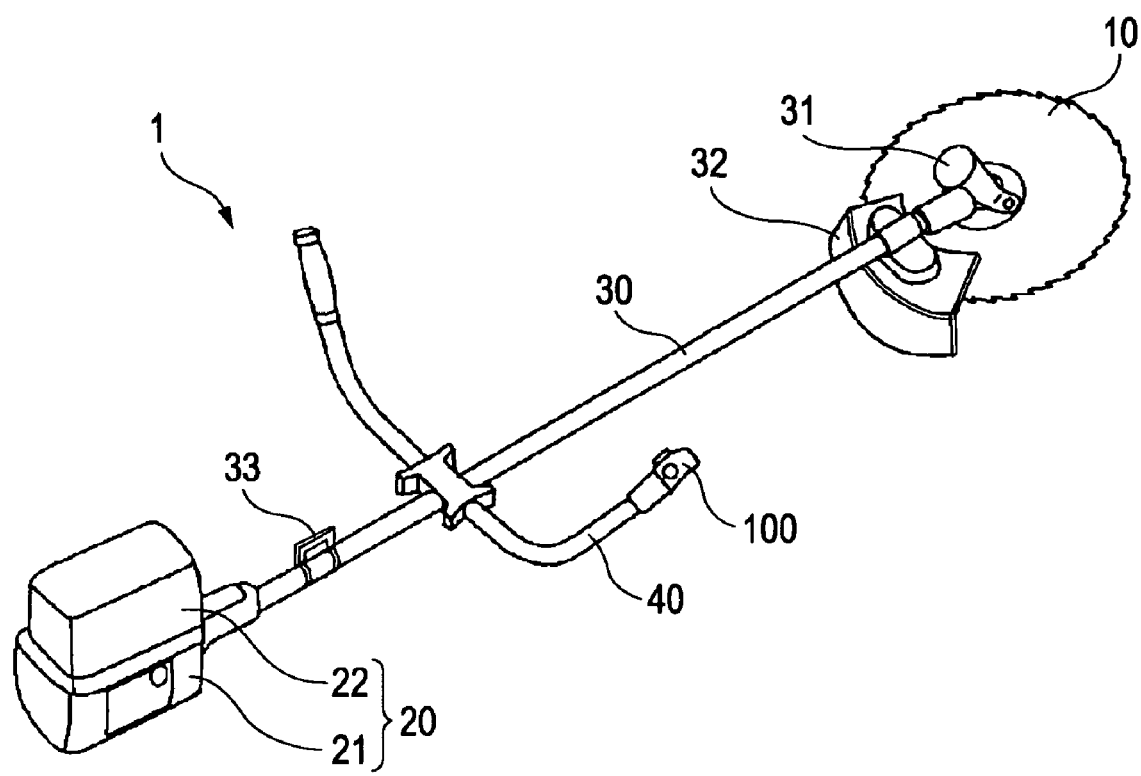
FIG. 1 is an external perspective view of a bush cutter according to an embodiment of the present invention.

FIG. 1 is an external perspective view of the bush cutter according to this embodiment.

A bush cutter 1 is of an electrical type that uses an electric motor as a power source which is driven by the electric power of a lithium-ion battery.

The bush cutter 1 includes, for example, a cutting blade 10, a power unit 20, a control arm 30, a handlebar 40, and a control handle 100.

The cutting blade 10 is a rotary tip saw for cutting, for example, vegetation to be bush cut. The cutting blade 10 is formed by fixing cemented carbide tips along the outer edge of a disc-shaped metallic plate.

The power unit 20 is a unit constituted by a motor section 21 for rotationally driving the cutting blade 10 and a battery section 22 for supplying electric power to the motor section 21.

The battery section 22 is equipped with a secondary battery, such as a lithium-ion battery, and is detachably mounted on top of the motor section 21.

The control arm 30 is provided between the cutting blade 10 and the motor section 21 of the power unit 20. The control arm 30 has a hollow tubular body which extends linearly and accommodates a rotary shaft that transmits an output from the motor section 21 to the cutting blade 10.

An end of the control arm 30 closer to the cutting blade 10 is provided with a cutting-blade holder 31 and a blade cover 32.

The cutting-blade holder 31 is a part to which the cutting blade 10 is attached, and is equipped with a power transmission mechanism that transmits the rotation of the rotary shaft to the cutting blade 10.

The blade cover 32 covers the side of the cutting blade 10 closer to the operator (i.e., the side closer to the handlebar 40) in order to protect the operator.

A section of the control arm 30 located between the handlebar 40 and the power unit 20 is provided with a hook 33 to which a shoulder strap can be fastened. The operator can wear this shoulder strap on his/her shoulder to support the bush cutter 1.

The handlebar 40 is a part where the operator can manually hold to support the bush cutter 1.

The handlebar 40 is formed of a pipe material, and the middle thereof is fixed to the middle of the control arm 30 so that they cross each other. The handlebar 40 is a single-piece component having a mid-segment that substantially extends in the horizontal direction (i.e., the left-right direction as viewed from the operator) when the bush cutter 1 is in normal use and left and right end segments that are upswept at a certain angle from the mid-segment.

These left and right end segments of the handlebar 40 are respectively provided with left and right handles that can be held by the operator's left and right hands. The right handle functions as the control handle 100 to be described below.

The control handle 100 is held by the operator's right hand and is used for performing various control, such as speed control, on/off control for an adjustable speed mode, on/off control for a high-speed mode, and unlocking control.

The bush cutter 1 is selectable between the adjustable speed mode in which the operator can set the rotation speed of the cutting blade 10 to a desired speed and the high-speed mode in which the cutting blade 10 rotates constantly at a permissible high rotation speed.

FIGS. 2A to 2C respectively show three faces of the control handle 100. In the description below, the side closer to the upper end and the side closer to the lower end of the control handle 100 as viewed in the longitudinal direction thereof in FIG. 2A will be referred to as an "upper side" and an "lower side", respectively. The side closer to the viewer in FIG. 2A will be referred to as a "front side" (which is shown on the left side in FIG. 2B and on the far side in FIG. 2C). The side farther from the viewer in FIG. 2A will be referred to as a "rear side" (which is shown on the right side in FIG. 2B and on the side closer to the viewer in FIG. 2C).

FIGS. 2A, 2B, and 2C respectively show three faces of the control handle 100, as viewed from the front side, the left side, and the rear side, respectively. Specifically, FIG. 2B is illustrated as viewed in the direction of arrows IIB shown in FIG. 2A, and FIG. 2C is illustrated as viewed in the direction of arrows IIC shown in FIG. 2B.

The control handle 100 includes, for example, a main body 110, a speed adjustment knob 120, a throttle lever 130, a lock member 140, a high-speed lever 150, and an emergency-stop/reverse button 160.

The main body 110 is formed by, for example, injection molding using a resinous material, and is a part that can be held by the operator's right hand and that serves as a base on which other components are mounted.

The main body 110 is constituted by two left and right pieces, namely, a right half portion 111 and a left half portion 112, and has a hollow interior. In the description below, the faces of the main body 110 that are oriented towards the front side and the rear side will be referred to as a "front face" and a "rear face", respectively.

The lower side of the main body 110 is provided with an attachment hole 161. The control handle 100 is attached to the handlebar 40 by fitting the right end of the handlebar 40 in the attachment hole 161. In this embodiment, the control handle 100 is secured such that the front side thereof is faced towards the cutting blade 10 whereas the rear side thereof is faced towards the power unit 20. Alternatively, the control handle 100 can be attached to any part where it can be manually held by the operator, such as the left end of the handlebar 40. Moreover, the attachment technique of the control handle 100 is not limited to that described in this embodiment.

The speed adjustment knob 120 functions as the speed adjuster that can be operated by the operator for adjusting the rotation speed of the cutting blade 10 during the adjustable speed mode. The speed adjustment knob 120 protrudes outward from the left half portion 112 of the main body 110. The speed adjustment knob 120 is connected to a rotary potentiometer provided within the main body 110. An output from this rotary potentiometer is supplied to a controller (not shown) for the power unit 20.

The left half portion 112 of the main body 110 is integrally provided with a speed-adjustment-knob protector 113 that protects the front area of the speed adjustment knob 120 so as to prevent an unintentional rotation-speed fluctuation from being caused by the operator.

The throttle lever (on/off lever) 130 functions as a driving controller that can be operated by the operator for starting the rotation of the cutting blade 10 (ON control) or for stopping the cutting blade 10 (OFF control).

The throttle lever 130 is provided on the front face of the main body 110. The throttle lever 130 is supported rotatably about a rotary shaft provided at the upper end thereof and extending in the left-right direction, and has an operable portion 131 that is made to protrude outward from the front face of the main body 110. When the operator manually holds the operable portion 131 and presses it towards the inside of the main body 110, the throttle lever 130 is switched on. The throttle lever 130 is equipped with a return spring (not shown) that biases the operable portion 131 away from the main body 110 towards the front side. Thus, when the force applied to the operable portion 131 from the operator's finger(s) is reduced or when the operator releases his/her finger(s) from the operable portion 131, the throttle lever 130 is switched off.

FIGS. 3A and 3B are right side views showing the inside of the main body 110 after the right half portion 111 is removed therefrom. Specifically, FIG. 3A shows the throttle lever 130 in a locked state, whereas FIG. 3B shows the throttle lever 130 in an unlocked state.

Figure 4:
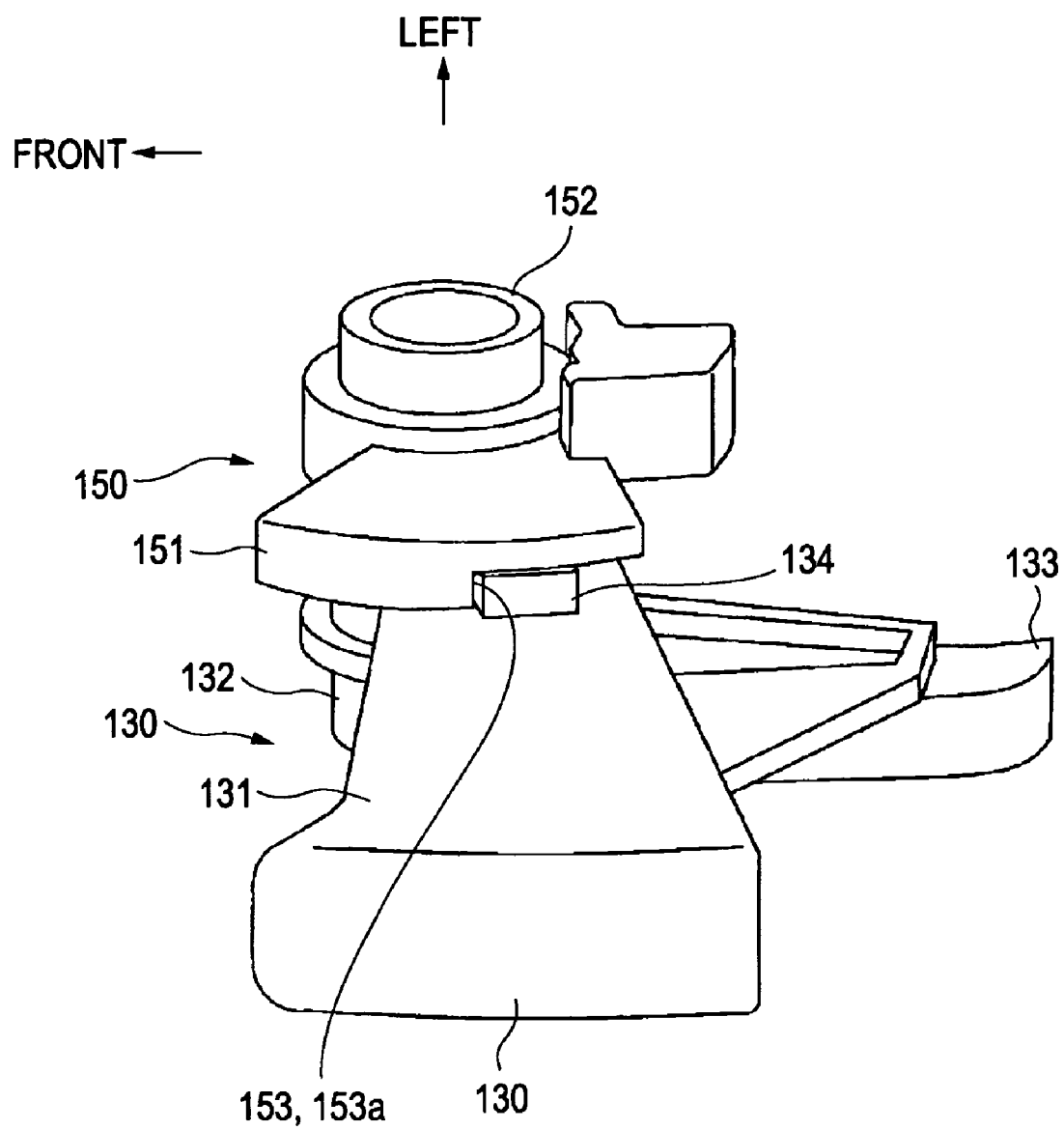
FIG. 4 is a perspective view showing an assembled state of a throttle lever and a high-speed lever of the control handle shown in FIGS. 2A to 2C, as viewed at an angle from the lower left side.

FIG. 4 is a perspective view showing the throttle lever 130 and the high-speed lever 150 in an assembled state, as viewed at an angle from the left lower side.

Figure 5:
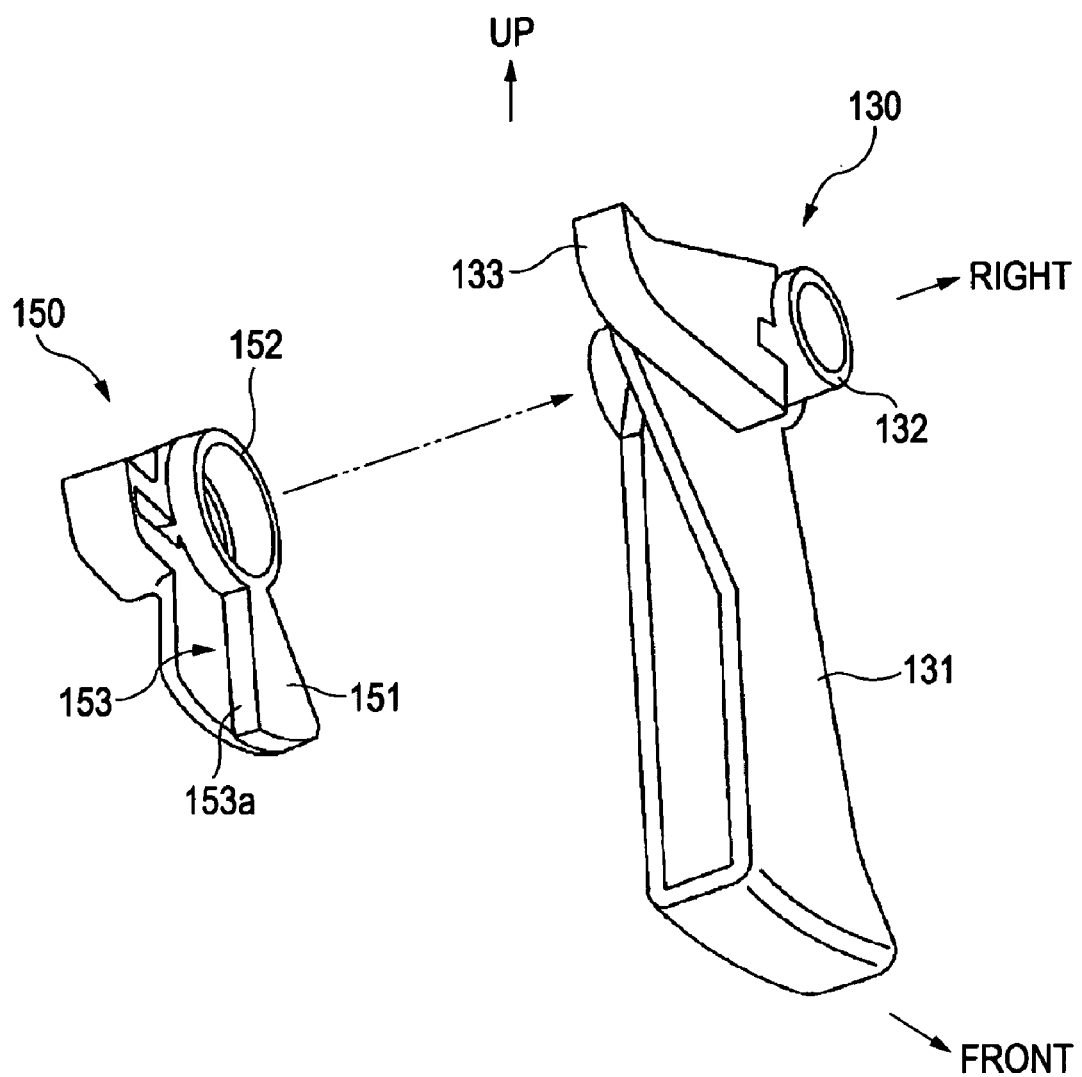
FIG. 5 is an exploded perspective view of the throttle lever and the high-speed lever of the control handle shown in FIGS. 2A to 2C, as viewed at an angle from the lower right rear side.

FIG. 5 is an exploded perspective view of the throttle lever 130 and the high-speed lever 150, as viewed at an angle from the lower right rear side.

Figure 6:
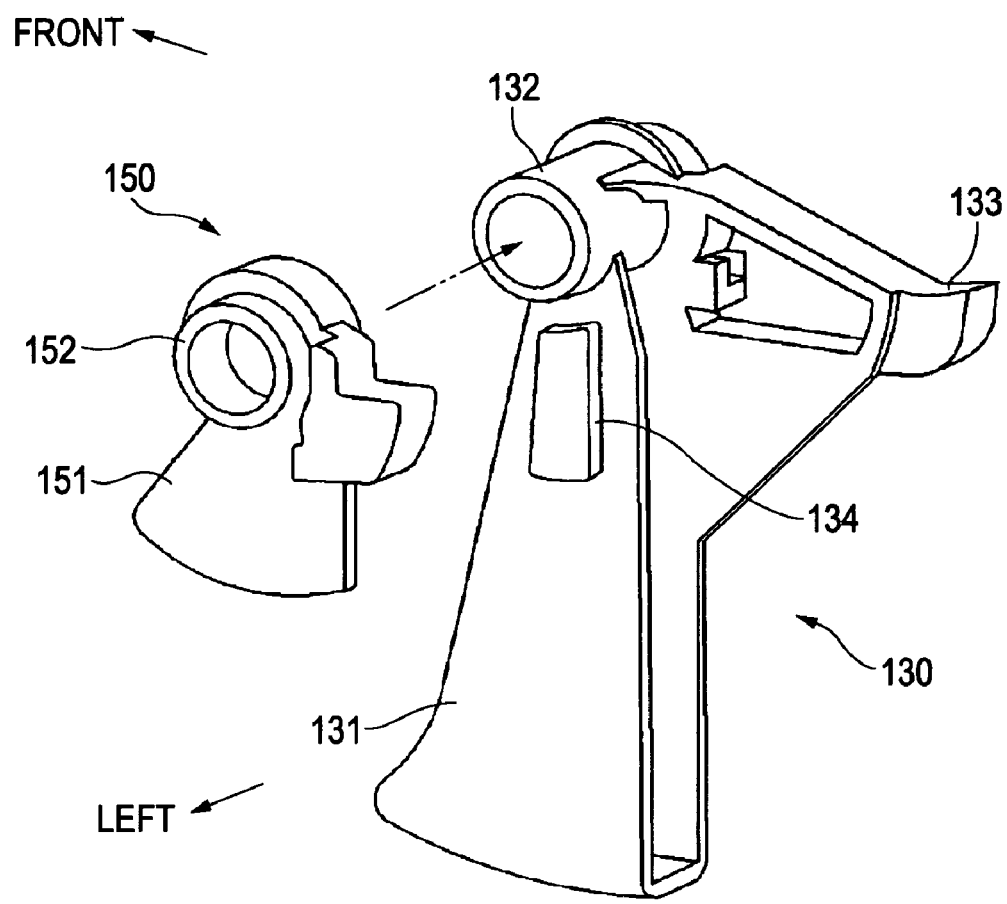
FIG. 6 is an exploded perspective view of the throttle lever and the high-speed lever of the control handle shown in FIGS. 2A to 2C, as viewed at an angle from the upper left rear side.

FIG. 6 is an exploded perspective view of the throttle lever 130 and the high-speed lever 150, as viewed at an angle from the upper left rear side.

The throttle lever 130 is integrally formed by, for example, injection molding using a resinous material so as to integrally include, for example, a cylindrical portion 132, a lock-member engagement claw 133, and a high-speed-lever engagement protrusion 134 in addition to the aforementioned operable portion 131, as shown in FIGS. 4 and 6.

The cylindrical portion 132 is provided at an upper section of the operable portion 131 and is disposed such that the central axis thereof extends in the left-right direction. The opposite ends of the cylindrical portion 132 protrude leftward and rightward from the operable portion 131. A shaft portion (not shown) provided in the main body 110 is fitted in the cylindrical portion 132. When the outer surface of this shaft portion slides on the inner surface of the cylindrical portion 132, the throttle lever 130 rotates relatively to the main body 110.

The lock-member engagement claw 133 protrudes rearward from the rear face of the right end of the cylindrical portion 132.

The high-speed-lever engagement protrusion 134 protrudes from the left face of the operable portion 131 below the cylindrical portion 132. In a left side view, the high-speed-lever engagement protrusion 134 substantially has a rectangular shape with longitudinal sides extending in the vertical direction.

The lock member 140 is configured to set the throttle lever 130 in a locked state or in an unlocked state. Specifically, in the locked state, the throttle lever 130 is fixed to a switch-off position. In contrast, in the unlocked state, which can be obtained by a predetermined unlocking operation, the throttle lever 130 can be switched on. In other words, the lock member 140 and the lock-member engagement claw 133 together constitute a lock device for locking the throttle lever 130.

As shown in FIGS. 3A and 3B, the lock member 140 is disposed behind the throttle lever 130.

The lock member 140 is integrally formed by, for example, injection molding using a resinous material so as to integrally include, for example, a shaft bearing portion 141, a throttle-lever engagement claw 142, and an unlocking lever 143.

The shaft bearing portion 141 is a cylindrical portion with a central axis extending in the left-right direction. The shaft portion formed in the main body 110 is fitted within the inner surface of this shaft bearing portion 141. The shaft bearing portion 141 is made to rotate when the inner surface of the shaft bearing portion 141 slides on the outer surface of the shaft portion.

The throttle-lever engagement claw 142 protrudes upward from the shaft bearing portion 141. The front edge of the upper end of the throttle-lever engagement claw 142 is provided with a step 142a that is engageable with the upper face of the rear end of the lock-member engagement claw 133 provided in the throttle lever 130.

The unlocking lever 143 is provided behind the shaft bearing portion 141, and the rear edge of the unlocking lever 143 protrudes from the rear face of the main body 110 so as to serve as an operable portion for unlocking the lock device.

As shown in FIG. 3A, when in the locked state, the step 142a formed on the throttle-lever engagement claw 142 of the lock member 140 is engaged with the rear end of the lock-member engagement claw 133 of the throttle lever 130. Thus, the throttle lever 130 is prevented from moving in the switch-on direction (i.e., clockwise in FIG. 3A).

On the other hand, as shown in FIG. 3B, when the operator moves the unlocking lever 143 downward with, for example, his/her thumb, the lock member 140 rotates counterclockwise in FIG. 3B, causing the step 142a of the throttle-lever engagement claw 142 to become disengaged from the lock-member engagement claw 133 of the throttle lever 130. Thus, the throttle lever 130 is permitted to rotate clockwise, so that when the operator holds the operable portion 131 and presses it towards the inside of the main body 110, the throttle lever 130 can be switched on.

The lock member 140 is provided with a return spring (not shown) that biases the lock member 140 clockwise in FIGS. 3A and 3B towards the main body 110. Thus, when the throttle lever 130 is switched off and the unlocking lever 143 is released (not operated) by the operator, the throttle lever 130 is automatically set to a locked state.

The high-speed lever 150 functions as a high-speed mode controller that can be operated by the operator for maintaining the rotation speed of the cutting blade 10 at a constant high rotation speed during the high-speed mode.

The high-speed lever 150 is provided on the front face of the main body 110 and is disposed to the left of the throttle lever 130.

The high-speed lever 150 is rotatable about the same axis as the central axis of rotation of the throttle lever 130 and has an operable portion 151 that is made to protrude from the front face of the main body 110. The operator can manually hold the operable portion 151 and press it towards the inside of the main body 110 so as to switch on the high-speed lever 150. The length of the operable portion 151 in the vertical direction is made smaller than that of the operable portion 131 of the throttle lever 130 so that the operable portion 151 does not interfere with the operation of the operable portion 131 of the throttle lever 130 during the normal adjustable speed mode. The high-speed lever 150 is equipped with a return spring (not shown) that biases the operable portion 151 away from the main body 110 towards the front side. Thus, when the force applied to the operable portion 151 from the operator's finger(s) is reduced or when the operator releases his/her finger(s) from the operable portion 151, the high-speed lever 150 is switched off.

The high-speed lever 150 is integrally formed by, for example, injection molding using a resinous material so as to integrally include, for example, a cylindrical portion 152 and a throttle-lever engagement step 153 in addition to the aforementioned operable portion 151.

The operable portion 151 is a substantially fan-shaped plate-like portion centered on the central axis of rotation of the high-speed lever 150.

The cylindrical portion 152 is provided at an upper section of the operable portion 151. A left shaft section of the cylindrical portion 132 of the throttle lever 130 is fitted within the inner surface of this cylindrical portion 152. The high-speed lever 150 is made to rotate relatively to the throttle lever 130 and the main body 110 when the cylindrical portion 152 and the cylindrical portion 132 slide against each other.

Referring to FIG. 5, the throttle-lever engagement step 153 is provided on a surface of the operable portion 151 that faces the operable portion 131 of the throttle lever 130. The throttle-lever engagement step 153 is faced towards the rear side and has a surface 153a that faces and abuts the front face of the high-speed-lever engagement protrusion 134 of the throttle lever 130. This surface 153a and the high-speed-lever engagement protrusion 134 together constitute an interlock device according to the present invention. The function of this interlock device will be described below.

When the throttle lever 130 and the high-speed lever 150 are in their switch-off positions, the surface 153a of the high-speed lever 150 and the high-speed-lever engagement protrusion 134 of the throttle lever 130 are in abutment with each other, as shown in FIG. 4.

When the operator switches on the throttle lever 130, only the throttle lever 130 rotates relatively to the main body 110, whereas the high-speed lever 150 does not rotate relatively to the main body 110, thereby moving the high-speed-lever engagement protrusion 134 away from the surface 153a. Accordingly, the throttle lever 130 can be switched on independently of the high-speed lever 150.

On the other hand, when the operator switches on the high-speed lever 150, the surface 153a presses the high-speed-lever engagement protrusion 134 of the throttle lever 130 so that both the throttle lever 130 and the high-speed lever 150 are made to rotate relatively to the main body 110 in the switch-on direction. In other words, when the high-speed lever 150 rotates relatively to the main body 110 in the switch-on direction, the throttle lever 130 is always made to also rotate relatively to the main body 110.

The emergency-stop/reverse button 160 is a push button switch provided on the rear face at the upper end of the main body 110 and is an operable portion that can be operated for performing an emergency-stop operation and a reverse operation.

When the emergency-stop/reverse button 160 is operated while the cutting blade 10 is rotating, the cutting blade 10 is made to stop immediately.

When the emergency-stop/reverse button 160 is operated while the cutting blade 10 is stopped, and the throttle lever 130 is subsequently rotated, the cutting blade 10 is made to rotate in the reverse direction of the rotating direction for the normal mode, thereby allowing for disentanglement for the cutting blade 10.

A method for controlling the bush cutter 1 by using the control handle 100 according to this embodiment will now be described.

Before starting the bush cutter 1, the throttle-lever engagement claw 142 of the lock member 140 and the lock-member engagement claw 133 of the throttle lever 130 are engaged with each other so as to be in a locked state, such that the throttle lever 130 is prohibited from being switched on. In addition, the high-speed lever 150 is also locked indirectly by the aforementioned engagement so as to be prohibited from being switched on.

When the bush cutter 1 is to be driven in the adjustable speed mode, the unlocking lever 143 is first pressed downward so as to disengage (unlock) the lock member 140 and the throttle lever 130 from each other. Subsequently, the throttle lever 130 is switched on, whereby the cutting blade 10 starts to rotate at a rotation speed preset by the speed adjustment knob 120. The speed adjustment knob 120 is adjustable during the rotation of the cutting blade 10. When the throttle lever 130 is switched off, the cutting blade 10 stops rotating and the lock device is set to the locked state again.

When the bush cutter 1 is to be driven in the high-speed mode, the unlocking lever 143 is pressed downward so as to disengage (unlock) the lock member 140 and the throttle lever 130 from each other. Then, the high-speed lever 150 and the throttle lever 130 are both switched on simultaneously, whereby the cutting blade 10 starts to rotate at high speed. On the other hand, even when switching on only the high-speed lever 150, the throttle lever 130 is concurrently switched on due to the effect of the interlock device. Therefore, when the high-speed mode is desired, the operator only needs to operate the high-speed lever 150. When switching from the adjustable speed mode already in progress to the high-speed mode, the operator can switch on the high-speed lever 150 in addition to (or in place of) the throttle lever 130. When the high-speed lever 150 is switched off, the high-speed mode is switched to the adjustable speed mode if the throttle lever 130 is switched on, or the cutting blade 10 stops rotating if the throttle lever 130 is released. In the latter case, the lock device is set to the locked state again.

The embodiment described above can provide the following advantages.

1. With the throttle-lever engagement step 153 and the high-speed-lever engagement protrusion 134 provided for interlocking the throttle lever 130 and the high-speed lever 150 when the high-speed lever 150 is switched on so as to move the throttle lever 130 concurrently with the high-speed lever 150, the bush cutter 1 can be driven in the high-speed mode, if desired by the operator, by simply operating the high-speed lever 150. This operation differs from the operation performed for the normal adjustable speed mode only in that the high-speed lever 150 is selectively operated in place of the throttle lever 130. Therefore, the operator can intuitively select between the adjustable speed mode and the high-speed mode, thereby improving the operability.

2. Since the above embodiment is equipped with the lock device constituted by, for example, the lock member 140 that locks the throttle lever 130 and the high-speed lever 150 at their switch-off positions, and the unlocking lever 143 that unlocks the lock device to set both the throttle lever 130 and the high-speed lever 150 in an operable state, the operator only needs to perform two manual operations to start the high-speed mode, which include unlocking the lock device by using the unlocking lever 143 and then operating the high-speed lever 150. Since this operation differs from the operation performed for the normal adjustable speed mode only in that the high-speed lever 150 is selectively operated in place of the throttle lever 130, the operator can intuitively select between the adjustable speed mode and the high-speed mode, thereby further improving the operability.

3. Since the lock device includes the lock member 140 that locks the throttle lever 130 by engaging with the lock-member engagement claw 133 of the throttle lever 130, the high-speed lever 150 can also be locked indirectly via the throttle lever 130 and the interlock device when the lock device locks the throttle lever 130. Accordingly, the lock device can have a simplified configuration, and the present invention can be applied to an already available control handle by a slight change in design.

MODIFICATIONS

The present invention is not limited to the above-described embodiment, and various modifications and changes are permissible and are within the technical scope of the invention.

1. Although the bush cutter in the above-described embodiment is of, for example, an electrical type, the present invention can also be applied to a bush cutter that uses an internal combustion engine as a power source. In that case, when the bush cutter is driven in the high-speed mode, the internal combustion engine is at full throttle.

2. The shapes, structures, and operating methods of the operable portions are not limited to those described in the above embodiment, and can be changed where appropriate. For example, the driving controller and the high-speed mode controller can alternatively be, for example, push button switches instead of the aforementioned levers that rotate about their axes. In addition, the operating method and the unlocking method of the driving controller are not particularly limited.

3. Although only the driving controller is configured to be locked directly by the lock device and the high-speed mode controller is configured to be locked indirectly via the interlock device in the above-described embodiment, the lock device can alternatively be configured to directly lock the driving controller and the high-speed mode controller.

What is claimed is:

1. A control handle adapted to be used in a bush cutter that cuts an object to be cut by driving a rotary cutting blade, the control handle comprising:
    a driving controller configured to control cutting blade rotation;
    a high-speed mode controller configured to set the rotation speed of the cutting blade to a high rotation speed; and
    an interlock device provided between the driving controller and the high-speed mode controller and configured to interlock the driving controller and the high-speed mode controller when the high-speed mode controller is switched on so as to move the driving controller concurrently with the high-speed mode controller,
    wherein, when the high-speed mode controller is switched on, the driving controller is concurrently switched on by the interlock device so that the cutting blade is driven in a high-speed mode.

2. The control handle according to claim 1, further comprising a lock device and an operable portion for unlocking the lock device, the lock device being configured to lock the driving controller and the high-speed mode controller to positions for stopping the cutting blade from rotating, the operable portion being configured to unlock the lock device so as to set both the driving controller and the high-speed mode controller in an operable state.

3. The control handle according to claim 2, wherein the interlock device includes an engagement member that brings the high-speed mode controller and the driving controller into engagement with each other when the high-speed mode controller is switched on, and wherein the lock device includes a lock member that engages with the driving controller.

4. A bush cutter comprising:
    a cutting blade;
    a power unit that rotationally drives the cutting blade;
    a control arm whose one end has the cutting blade attached thereto; and
    the control handle according to claim 1, the control handle being fixed to the control arm and used for controlling the power unit.

5. A bush cutter according to claim 4, further comprising a lock device and an operable portion for unlocking the lock device, the lock device being configured to lock the driving controller and the high-speed mode controller to positions for stopping the cutting blade from rotating, the operable portion being configured to unlock the lock device so as to set both the driving controller and the high-speed mode controller in an operable state.

6. A bush cutter according to claim 5, wherein the interlock device includes an engagement member that brings the high-speed mode controller and the driving controller into engagement with each other when the high-speed mode controller is switched on, and wherein the lock device includes a lock member that engages with the driving controller.

7. The control handle according to claim 1, further comprising a speed adjuster configured to pre-set a rotation speed within a range of blade rotation speeds, and wherein said driving controller, when in a turn on cutting blade rotation state, provides for the cutting blade being driven at the pre-set rotation speed.

8. The control handle according to claim 7, wherein said driving controller is further configured to stop cutting blade rotation.

9. The control handle according to claim 8, wherein said high-speed mode controller is further configured to stop cutting blade rotation.

10. The control handle according to claim 9, wherein each of said driving controller and said high-speed mode controller is biased to a cutting blade rotation stop setting when not adjusted in position by an operator.

11. The control handle according to claim 7, wherein said high-speed mode controller is further configured to stop cutting blade rotation.

12. The control handle according to claim 1, wherein said driving controller and said high-speed mode controller are arranged as to rotate about a common axis.

13. A bush cutter according to claim 4, further comprising a speed adjuster configured to pre-set a rotation speed within a range of blade rotation speeds, and wherein said driving controller, when in a turn on cutting blade rotation state, provides for the cutting blade being driven at the pre-set rotation speed.

14. A bush cutter according to claim 13, wherein said driving controller is further configured to stop cutting blade rotation.

15. A bush cutter according to claim 14, wherein said high-speed mode controller is further configured to stop cutting blade rotation.

16. A bush cutter according to claim 15, wherein each of said driving controller and said high-speed mode controller is biased to a cutting blade rotation stop setting when not adjusted in position by an operator.

17. A bush cutter according to claim 4, wherein said high-speed mode controller is further configured to stop cutting blade rotation.

18. A bush cutter according to claim 4, wherein said driving controller and said high-speed mode controller are arranged as to rotate about a common axis.

\* \* \* \* \*